July 6, 1926.

H. DE F. MADDEN ET AL 1,591,716

COMBINED BUTTON MAKING AND INSERTING MACHINE

Filed April 27, 1922    6 Sheets-Sheet 1

FIG.1.

INVENTORS
HARRY D. MADDEN.
JOHN J. HIGGINS.
BY
*J. F. Eckert*
ATTORNEY

July 6, 1926.  
H. DE F. MADDEN ET AL  
1,591,716  
COMBINED BUTTON MAKING AND INSERTING MACHINE  
Filed April 27, 1922  6 Sheets-Sheet 2

INVENTORS  
HARRY D. MADDEN.  
JOHN J. HIGGINS.  
BY  
ATTORNEY

July 6, 1926.

H. DE F. MADDEN ET AL 1,591,716

COMBINED BUTTON MAKING AND INSERTING MACHINE

Filed April 27, 1922    6 Sheets-Sheet 3

INVENTORS
HARRY D. MADDEN.
JOHN J. HIGGINS.
BY
ATTORNEY

July 6, 1926.

H. DE F. MADDEN ET AL

1,591,716

COMBINED BUTTON MAKING AND INSERTING MACHINE

Filed April 27, 1922     6 Sheets-Sheet 4

INVENTORS
HARRY D. MADDEN
JOHN J. HIGGINS
BY
ATTORNEY

INVENTORS
HARRY D. MADDEN
JOHN J. HIGGINS
BY

ATTORNEY

July 6, 1926.

H. DE F. MADDEN ET AL 1,591,716

COMBINED BUTTON MAKING AND INSERTING MACHINE

Filed April 27, 1922   6 Sheets-Sheet 6

INVENTORS
HARRY D. MADDEN
JOHN J. HIGGINS.
BY
*J. H. Hebert*
ATTORNEY

Patented July 6, 1926.

1,591,716

UNITED STATES PATENT OFFICE.

HARRY DE FOREST MADDEN, OF NEWARK, AND JOHN JOSEPH HIGGINS, OF EAST ORANGE, NEW JERSEY, ASSIGNORS TO WESTINGHOUSE LAMP COMPANY, A CORPORATION OF PENNSYLVANIA.

COMBINED BUTTON MAKING AND INSERTING MACHINE.

Application filed April 27, 1922. Serial No. 556,957.

This invention relates to machines for manufacturing incandescent electric lamps and more particularly to machines for performing the operations essential to the completion of a stem or spider upon which a filament or filaments may be subsequently mounted.

An object of the present invention is to provide a machine for the expeditious handling of glass rods or stems for the performance of successive operations thereon.

Another object of the invention is the provision of coordinating machine elements for moving stems or rods into heat zones to render portions of the rods plastic and to form enlargements or buttons thereon and subsequently position the rods for the insertion of support wires.

A further object of the invention is the provision of an apparatus in which a rod may be intermittently moved from one position to another for successive operations thereon which results, after a given number of movements, in producing one or more buttons upon the rod and the insertion therein of a plurality of radially projecting support wires and in shaping the exposed ends of the support wires to hook form.

A still further object of the invention is to provide a mechanism for simultaneously forming an upper and lower button on a rod and inserting support wires into buttons previously formed on another rod.

Other objects and advantages will be apparent upon a reading of the following specification and by reference to the accompanying drawings, in which.

A machine embodying our invention may comprise a base upon which is mounted a rotatable conveyor or spider. A plurality of work holders may be carried by the conveyor and thus be rotated or otherwise moved in a series of intermittent steps, the conveyor being temporarily stopped after each movement for a sufficient interval of time to permit various operations to be performed on work parts supported in the holders. At the initial step or starting point, the operator inserts a work part which, in the present machine, consists of a stem including a cylindrical rod or tube of glass. This work part is then moved to a predetermined position and flames are caused to impinge on the upper end of the glass rod to render plastic a given portion thereof.

At the proper moment, a push rod descends and, contacting with the plastic portion, upsets the rod by flattening the same, thus producing a button at the end of the rod. The conveyor then moves the work part to another station where mechanism inserts a plurality of support wires into the button and forms hooks or loops on the exposed ends of the wires.

The conveyor then carries the work part the next step in its cycle to a position adjacent fires which render plastic a portion of the rod at a point intermediate the previously formed button and the opposite end of the rod. A push rod then descends to engage the rod and upset the same to form a bulge or enlargement which is termed a button. Another movement of the conveyor brings the second-formed button in position adjacent another wire-inserting and hook-forming mechanism which then actuates to insert a plurality of wires into the last-formed or lower button and to subsequently form hooks on the ends of the inserted wires.

The next two movements of the conveyor bring the work holder back to its initial position, whereupon the operator may remove the completed stem and insert another work part upon which the above described operations may be automatically performed.

Figure 1:
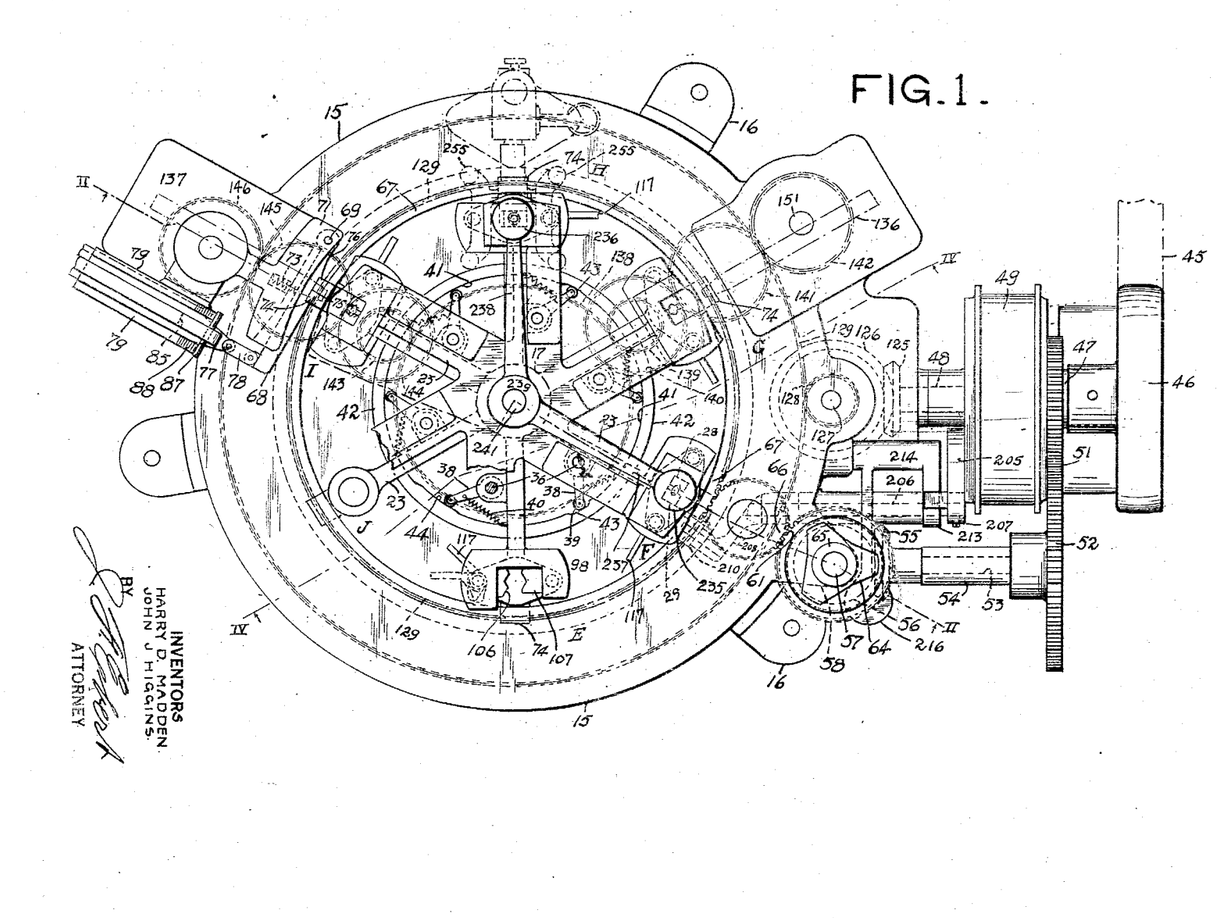
Fig. 1 is a plan view of the machine having several of the parts broken away to more clearly illustrate lower portions of the machine.
Figures 2, 3:
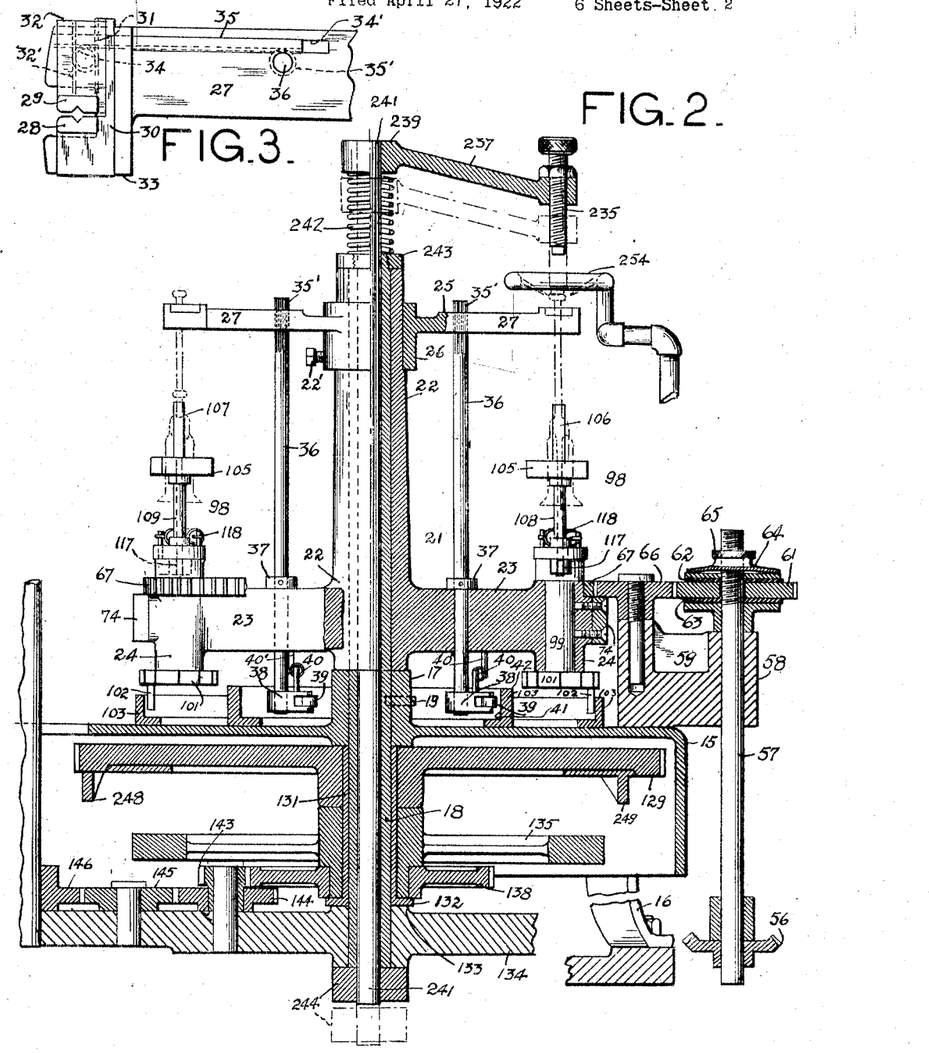
Fig. 2 is a view partly in elevation and partly in section taken on the line II—II in Fig. 1, a portion of the machine being broken away.
Fig. 3 is a plan view of a portion of one of the conveyor arms and the clamping jaws carried thereby.

Referring now to the drawings and particularly to Figs. 1 and 2, our machine, as illustrated, includes a base 15 which is supported on legs 16 and provided with a centrally disposed hub 17 in which a sleeve 18 is rigidly secured by a pin 19. This sleeve projects upwardly above the base and has mounted thereon a spider or rotary element which, as a whole, is designated by the reference numeral 21. This spider is provided with a central hub 22 and a plurality of radially extending arms 23 which terminate in hubs or bearings 24. The hub is loosely disposed upon the sleeve 18 and capable of rotation therearound. Work holders, to be later described, are rotatably mounted in the hubs 24. The upper end of hub 17 of the base 15 affords a seat or bearing surface upon which the spider 21 may ride. At the upper end of the hub 22, of the rotary element or spider, is positioned a jaw carrier 25 which comprises a hub 26 secured to the hub 22 by a set screw 22' and having integral therewith a plurality of arms 27. Thus, the rotary element 21 is adapted to carry the jaw carrier 25. Hereinafter, the spider or rotary element 21 and the jaw carrier 25 will, as a whole, be termed a conveyor.

The arms of the jaw carrier 25 are equal in number to the arms of the spider 21 and each arm is equipped with a pair of slidable jaws 28 and 29 which are shown more clearly in Fig. 3. The jaw 28 is provided with a shank 30 having teeth 31 disposed along one of its edges, and the jaw 29 is provided with a shank 32 having a rack secured to the under side thereof and having the teeth 32' thereof facing the teeth 31 and disposed in the same plane, both shanks being movable horizontally in a suitable groove disposed in a casing 33 provided at the end of and transverse to the arm 27. The jaws are provided for the purpose of gripping a rod or arbor portion of a stem and may be actuated by the rotation of a gear wheel 34 which is disposed between, and in mesh with, the teeth secured to the two above-mentioned shanks. It will thus be evident that a rotation or oscillation of the gear wheel 34 will produce a movement of the jaws 28 and 29 in opposite directions, causing them to open or close.

Means for rotating the gear wheel 34 in each arm consists in the provision of a rack 35 in mesh with the gear wheel and movable in a slot 34' in the arm 27. A reciprocatory movement of the rack will, therefore, effect a rotation or oscillation of the gear wheel 34, this movement being produced by the engagement of the rack with teeth 35 provided at the upper end of a vertical rod 36. This rod extends downwardly through an arm of the spinder 21 which is positioned beneath a corresponding arm 27 of the jaw carrier 25. A collar 37 may be provided to give a bearing surface to the rod 36 and the lower end of the rod may be provided with a lever arm 38 having a roller 39 mounted upon its free end. This roller is disposed in contact with a cam surface 41 of an annulus 42 suitably positioned upon, and secured to, the base 15. The arms are normally maintained with the rollers 39 in contact with the cam surface by means of springs 40 which have one end secured to the lever 38 and the other end secured to a pin 40' fixed in an arm of the spinder 21. When the conveyor is moved by means to be hereinafter described, the roller 39, traversing the cam face, actuates the rod 36 in accordance with various undulations of a cam 42. These undulations comprise several depressions 43 and elevations 44 on the cam face, as shown in Fig. 1, and are important in that they are positioned to actuate the jaws 28 and 29 to either tightly grip a work part or release it for purposes which will hereinafter more fully appear.

The various movable elements of my machine may be driven by any suitable source of power as, for instance, a motor (not shown) connected by a belt 45, indicated in dotted lines (Fig. 1) to a pulley 46 secured to a main driving shaft 47. Although the pulley may be driven continuously, it is connected to a supplemental driving shaft 48 by an interposed friction clutch 49. This clutch may be of the usual type in which is disposed one or more friction members adapted to be moved into and away from engagement with the main driving shaft 47; thus, the supplemental driving shaft 48 may be engaged or released and, consequently, a movement of the machine produced or terminated accordingly. The internal structure of this clutch is well-known and, therefore, not shown. External means for actuating the clutch will be later described.

The conveyor which, as above stated, includes the jaw carrier 25 and the spider 21, is driven directly from the main-driving shaft 47 and is associated therewith by a gear wheel 51 secured to the said shaft and disposed in mesh with a gear wheel 52 fastened to one end of a shaft 53 rotatable in a bearing 54. The opposite end of the shaft 53 is provided with a beveled gear wheel 55 which, in turn, is disposed in mesh with a beveled gear wheel 56 secured to the lower end a vertical shaft 57. The shaft 57 is mounted in a bearing 58 (see Fig. 2) of a bracket 59 secured to the base 15. This shaft projects upwardly from its bearing and has loosely fitted thereto, a gear wheel 61.

The gear wheel 61 is adapted to frictionally engage the shaft 57 by means of upper and lower friction plates 62 and 63, respectively, which are maintained in firm contact with the gear wheel 61 by a tension member 64 which is provided with a threaded hub 65 and screwed downwardly on the shaft 57 to afford the proper tension to secure the gear wheel 61, with the desired amount of frictional resistance, against movement. Motion from the shaft 57 is translated to the conveyor by an interposed gear wheel 66 which is disposed in mesh with the gear wheel 61 and with a gear wheel 67 secured to, and encircling, the extremities of the arms 23 of the spider 21.

It will thus be evident that the conveyor is driven by a rotation of the shaft 57 and that a termination of movement of the conveyor may be readily effected by sufficient opposition to overcome the frictional resistance of the plates 62 and 63 thus causing the gear wheel 61 to slip until such opposition is removed, whereupon rotation of the conveyor will be resumed.

Figures 8, 9:
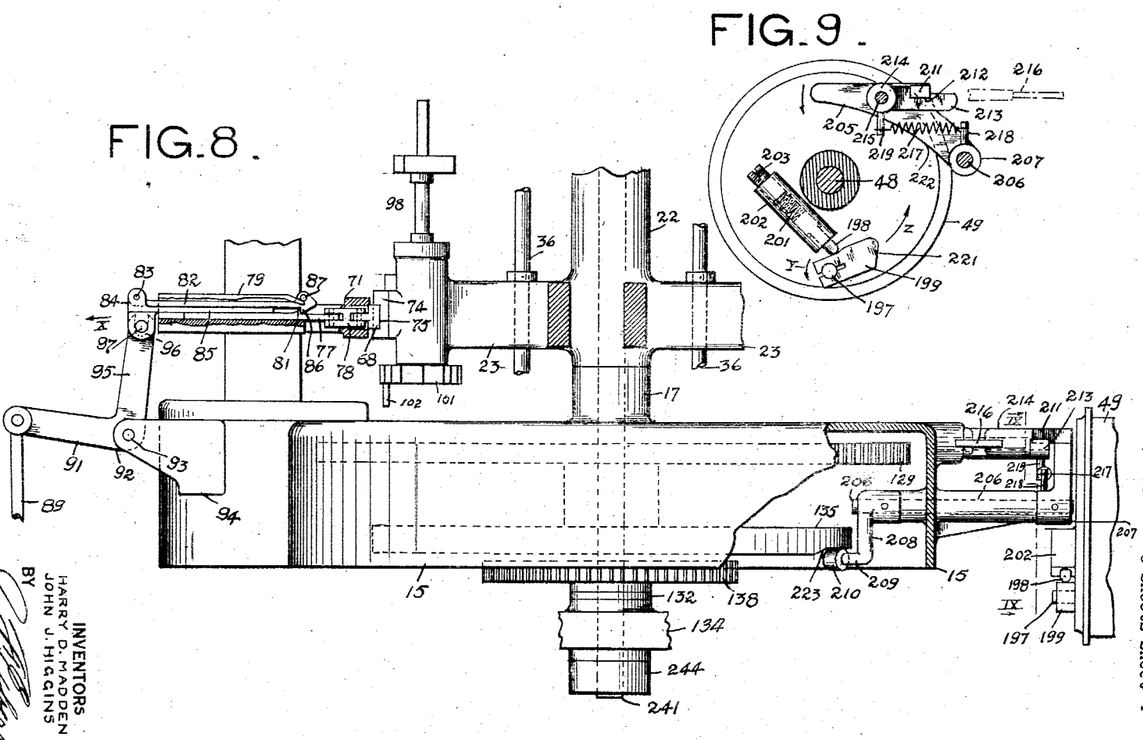
Fig. 8 is a fragmentary view of the machine showing the supporting and stopping mechanism.
Fig. 9 is a view taken on line IX—IX in Fig. 8.
Figures 10, 11:
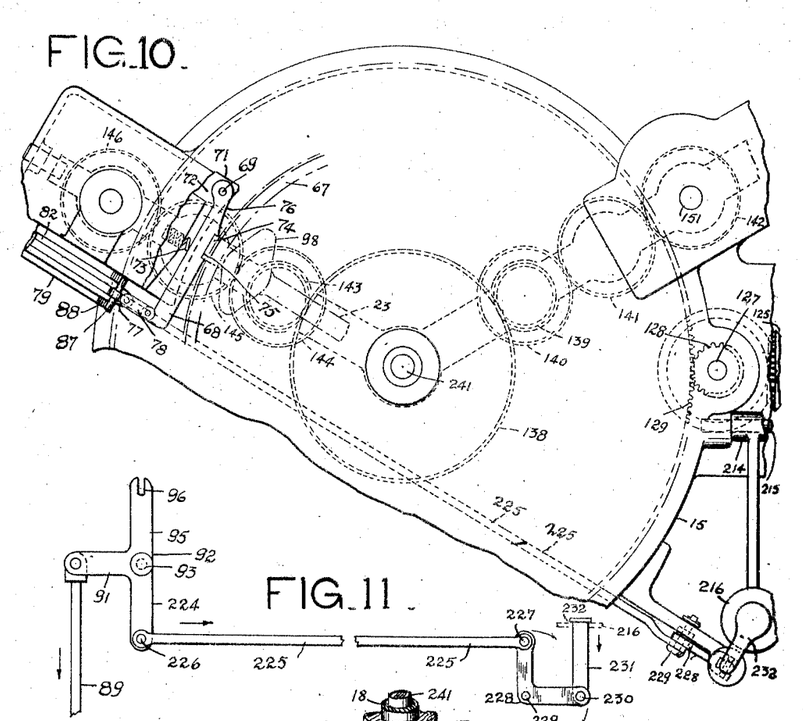
Fig. 10 is a fragmentary view of the base of the machine showing the stop mechanisms.
Fig. 11 illustrates the elements for operating the stop mechanisms.

For the purpose of terminating the movement of the conveyor at will, a stop mechanism is provided which is shown in Figs. 1, 8 and 10 and consists of a stop arm 68 pivoted on a pin 69 and carried in a bracket 71 secured to any stationary portion of the structure. The bracket 71 is provided with a recess or slot 72 (see Fig. 10) in which the stop arm is partially disposed, and a spring 73, positioned in a pocket adjacent the recess, serves to normally force the arm outwardly and in the path of projections or lugs 74 secured to the extreme ends of the spider arms 23. The stop arm 68 is provided with a notch or recess 75 in which the lugs 74 become disposed when a spider arm moves them to position over an inclined face 76 of the stop arm.

When a lug is positioned in the recess 75, the movement of the conveyor is terminated and, although the shaft 57 continues to rotate, the opposition to the friction drive is such as to cause the plates 62 and 63 to slip and rotate independently of the gear wheel 61.

The conveyor may, however, be released for additional movement by an actuation of the stop arm 68. Mechanism for moving the arm 68 to release the lug 74 (Fig. 8) comprises a reciprocal member 77 connected to the stop arm 68 by a link 78. The member 77 is disposed in a trough or box 79 and is provided with a lug 81. Positioned above the member 77 is an arm 82 pivoted on a pin 83 disposed in a bearing 84 intergral with a sliding bar 85. When the lug 74 of the conveyor has entered recess 75 of the stop arm, an end or claw 86, integral with the arm 82, becomes positioned in engagement with the lug 81, and a transverse bar 87 which passes through the free end of the arm 82 engages the lower end of a beveled portion 88 provided at one end of the box 79. A movement of the sliding bar 85 in the direction of the arrow "X" operates to withdraw the stop arm 68 from engagement with the projection 74; at the same time, the bar 87 moves up the beveled surface 88, with the result that the arm 82 is lifted and the claw 86 is released from engagement with the lug 81.

The conveyor being then released, moves from the proximity of the stop 68; the stop then returns, under the action of the spring 73, to its normal position in the path of a succeeding arm. This stop device may be actuated either by hand or by a foot treadle (not shown) which may be connected to a rod 89 which, in turn, is pivotally connected to an arm 91 of a bell crank 92, mounted on a pin 93 in a bracket 94 secured to the base of the machine. An upwardly extending arm 95 of the bell crank is provided with a slot 96 at one end thereof and so positioned as to engage a pin 97 rigidly secured in the sliding bar 85. Thus, a downward movement of the rod 89 effects a movement of the bar 85 in the direction of the arrow "X" with the result above described.

The immediate foregoing description sets forth the manner and means for driving, stopping, and releasing the conveyor which carries the work parts. It will be observed that, although a single source of power is employed for driving the various parts of the machine, the conveyor may be stopped and started independently of the movement of other parts by virtue of the friction-drive connection carried on the vertical shaft 57.

Each arm of the spider 21 of the conveyor is provided with a rotatable work holder above referred to and designated as a whole by the numeral 98 and provided with a shaft 99 rotatable in the hub 24 at the end of arm 23 of the spider. A ratchet wheel 101 (see Fig. 2) is secured to the lower end of the shaft; the purpose of this ratchet wheel and its association with other parts will be more fully described below. Depending from the ratchet wheel is a pin 102 adapted to engage the surface of a guide member 103. The guide member 103 is secured to the casing 15 and so positioned as to make contact with the pin 102 and thereby maintain the head 98 in a given position with respect to the arm 23 upon which it is carried. This control of the position of the head is maintained throughout a given movement of the conveyor. At certain other positions, however, as, for instance, when the wires are being inserted into the button, as later described, the holder must necessarily be rotated, at which time the pin is moved from contact with the guide member 103.

Figure 15:
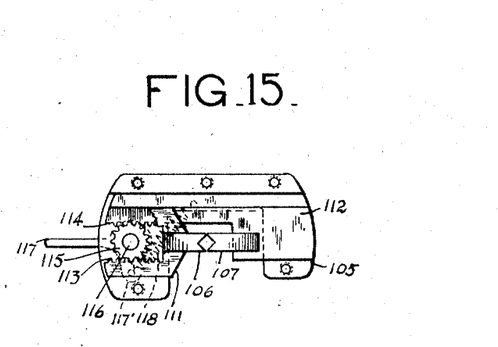
Fig. 15 is a plan view of the lower work holder, certain parts being broken away to more clearly illustrate the actuating mechanism for the jaws; and, Fig. 16 is an elevational view of one of the work holders.
Figure 16:
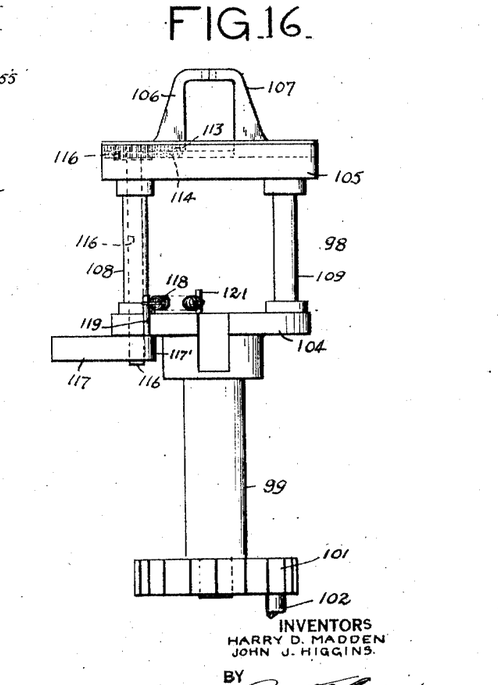

The work holder 98 is shown more clearly in Figs. 15 and 16 and comprises a cross piece 104 which is rigidly secured to the upper end of the shaft 99. At a suitable distance above the cross piece 104 is positioned a jaw carrier 105 in which are slidably disposed a pair of jaws 106 and 107. The jaw carrier is supported on vertical posts 108 and 109 secured to the cross piece 104. The jaw 106 is provided with a shank 111, and the jaw 107 is provided with a shank 112. These shanks 111 and 112 are disposed in different planes and are provided with oppositely positioned toothed portions or racks 113 and 114, respectively.

Disposed between and in mesh with said racks is a gear wheel 115 carried at the end of a shaft 116 rotatable within the post 108. A rotation of the shaft 116 will, therefore, effect rotation of gear wheel 115 and cause a reciprocation or opening and closing of the jaws 106 and 107. Actuation of the jaws may be produced by manual manipulation of an arm 117 of a bell crank secured to the lower end of the shaft 116. The jaws are maintained normally closed through the action of a spring 118 one end of which is secured to a pin 119 fastened to an arm 117' of the crank 117, the other end of the spring being secured to a pin 121 fastened in the cross piece 104. The spring being of a helical type and under tension, it exerts a continual pull upon the arm 117' and serves to normally close the jaws 106 and 107.

When it is desired to insert a work part in the holder, the arm 117 is moved in opposition to the spring 118 to open the jaws 106 and 107. The gripping faces of the jaws are elevated above the casing 105 and are adapted to grip an arbor 123 of a stem 124 at a point slightly above its union with the enlarged portion or flare tube 124' with which it is combined. The relative positions of the jaws, when holding a stem, are shown in dotted lines in Fig. 14.

From the foregoing it will be readily understood that, at the initial or loading position of the conveyor, a combined flare tube and arbor may be readily supported, the lower portion of the arbor being gripped by the jaws 106 and 107 while the upper portion of the arbor is positioned between the upper jaws 28 and 29 which are open at the loading position. These jaws carried on arm 27 (see Fig. 2) are disposed above the holder 98 in such position as to bring the jaws in cooperative working relation with the jaws of the holder 98, whereby a work part is supported in a vertical position.

When the conveyor moves, the jaws 28 and 29 are automatically closed to grip the arbor at a point adjacent its upper end. It will thus be evident that a work part may be conveniently positioned and automatically disposed in a given vertical position.

When a work part has been properly positioned by a movement of the conveyor, other mechanism is operated to form a button and to insert support wires into said button. The mechanism for performing the operation of forming the button and inserting the support wires being co-related, it will simplify the understanding of their operation to first consider the means for driving the various parts which perform the wire-inserting operation, motion being translated to the operative parts thereof from the driving shaft 48.

As shown in Fig. 1, the shaft 48 is provided with a beveled gear wheel 125 disposed in mesh with a beveled gear wheel 126 secured to a vertical shaft 127. At the upper end of shaft 127 is fastened a spur gear wheel 128 disposed in mesh with a large gear wheel 129. The gear wheel 129 is secured to, and mounted on, a hollow shaft 131 (see Fig. 2) which, in turn, is rotatably mounted on the sleeve 18. This shaft 131 is provided with an annular bearing piece 132 which makes contact with a boss 133 of a cross piece or bracket 134. This bracket carries other gearing and is secured to the sides of the base 15. The hollow shaft 131 also carries a cam member 135 which actuates mechanism for stopping the machine, and its association with such mechanism will be later described.

The mechanism for inserting the support wires and forming hooks or loops on the ends thereof, above referred to but not as yet decribed, is driven by its connection with the hollow shaft 131 which connection consists of a train of gear wheels to which reference will presently be made. A ram or wire-inserting member 136 for inserting support wires in an upper button of an arbor is indicated in dotted lines in Fig. 1 and a similar ram 137 for inserting the support wires in a lower button is indicated in dotted lines in Fig. 1. The ram 136 is actuated through motion translated by means of a gear wheel 138 which is centrally disposed with respect to the base and by intermediate gear wheels 139, 140, 141 and 142 (see Figs. 1, 2 and 10). The ram 137 is actuated by means of a train of gear wheels 143, 144, 145 and 146 which are driven by their connection with the said gear wheel 138; this gear wheel is secured to and is rotatable with the cam member 135.

Each of the gear wheels in the drawing, except in Fig. 2, are shown by means of dotted circles that indicate the tops and bottoms of the teeth and pitch circles, this illustration being more readily understood in a drawing on this small scale than if complete teeth were shown. It is obvious that the ratios between the gear wheels may be varied, as, for instance, the train of gear wheels which operate the rams may be made of such proportion as to reciprocate the rams a different number of times with each revolution of the gear wheel 129.

The mechanism for inserting support wires and for forming the hooks or loops on the ends thereof may be of any well known design, the one shown in the drawing being of a type commonly employed in the lamp-making art and is termed a support-wire-inserting head. The head includes a standard 147 (see Fig. 4) consisting of a bracket 148 and a vertical bearing 149 in which a shaft 151 is disposed having secured thereto the gear wheel 142. The shaft 151 is driven by means of its association with the above mentioned gear train including gear wheels 141, 139, etc.

Figures 4, 5, 6, 7:
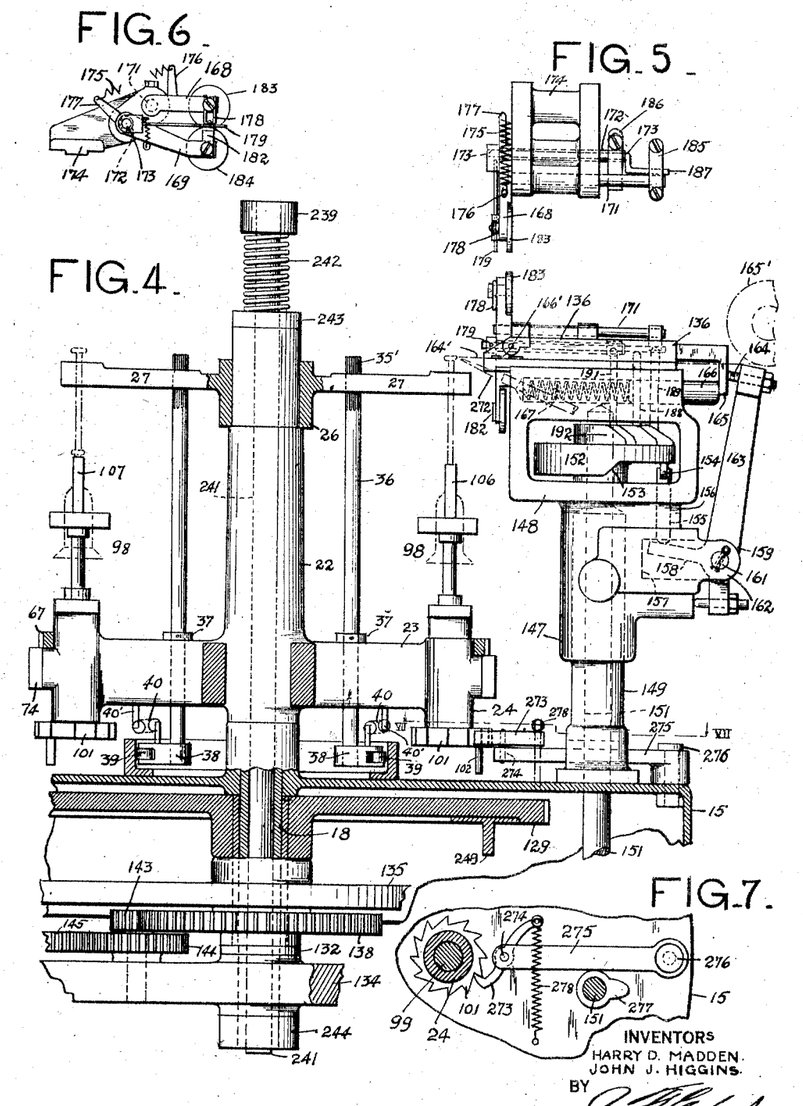
Fig. 4 is a side elevational view of the machine taken on line IV—IV in Fig. 1, part of the machine being shown in section.
Fig. 5 is a plan view of a portion of the wire-inserting mechanism.
Fig. 6 is a front elevational view of Fig. 5.
Fig. 7 is a view taken on line VII—VII in Fig. 4.

Inasmuch as the head for inserting the support wires in an upper button and that for inserting the wires in the lower button are the same, a description of the former head, as shown in elevation in Fig. 4, will suffice for a description of both.

Rotation of the shaft 151 causes the actuation of other movable elements which results in a reciprocation of the ram 136. These elements may include a plate 152 secured to the shaft 151 and rotatable therewith. On the under side of the plate 152 a cam face 153 is provided and so disposed as to make contact with a roller 154 at one end of a vertical reciprocal rod 155. The rod 155 is movable in a bearing disposed in a portion 156 of the standard 147.

The lower end of the rod 155 extends into a recess 157, disposed in an offset portion of the standard 147. and makes contact with an arm 158 of a bell-crank lever 159 which is pivoted on a pin 161 supported in a bearing 162 integral with the standard.

The other arm 163 of the bell-crank lever projects in an upward direction and is provided with a set screw 164 adapted to be moved into contact with a depending finger 165 integral with the ram 136; thus, a movement of the cam face 153 operates to rock the bell-crank lever 159, causing the set screw 164 to make contact with the finger 165 and thereby thrust the ram toward the work.

Wire 164' may be led to the ram from spool 165' and passed beneath a jaw 166' of the ram which grips the wire during the forward stroke of the ram and releases the wire upon the return movement. A movement of the ram in an opposite direction or from the work is caused by means of a spring-actuated plunger 166 slidable in a bore suitably positioned in the bracket 148. The plunger is so disposed as to have one end thereof constantly in contact with the side of the finger 165 opposite to that upon which the set screw 164 engages. Between the inner end of the plunger and the end of the bore is positioned a helical spring 167 which is compressed when the ram is thrust toward the work by a movement of the bell-crank lever in one direction and expands causing the plunger to move the ram away from the work when the bell-crank lever is released from the action of the cam 153.

Any suitable mechanism for forming loops or hooks may be incorporated in this machine. Such mechanism usually consists of a detachable device applicable to the inserting head and operated by means of its connection with an upper cam surface of the plate 152. Such devices are well known and their connection to a head of the type illustrated will be obvious to anyone skilled in the art.

The selected hook-forming device shown includes a pair of oscillatory arms 168 and 169 carried on shafts 171 and 172, respectively, (see Figs. 4, 5 and 6). The shaft 172 is, however, hollow and disposed therein is an internal shaft 173. The shafts 171 and 172 are mounted in bearings of a bracket 174 which may be bolted to the standard 147. The arms are normally maintained apart by the action of a helical spring 175 the ends of which are connected to projections 176 and 177 integral with the arms 168 and 169, respectively; Fig. 4 shows the arms in an open position. The arm 168 is provided with a member 178 for bending the wire about a finger 179 which is carried by the shaft 173, and the lower arm 169 is provided with a guide member 182. The arms 168 and 169 are also provided with discs 183 and 184, respectively, which are so positioned as to form contiguous cutting edges to sever the wire prior to the hook-forming operation which is effected by an actuation of the several shafts carrying the arms and the finger. The shafts project from the opposite end of the bearings in the bracket 174; the shafts 171 and 172 being provided with lever arms 185 and 186, respectively.

The internal shaft 173 extends beyond the projecting portion of the shaft 172 and is bent to constitute a crank 187.

When the hook-forming device is positioned upon the head, the crank 187 and the lever arms 185 and 186 are disposed in operative relation to vertical plungers 188, 189 and 191, respectively, having their lower ends in engagement with the upper surface of plate 152 which is provided with undulations or cams 192. Rotation of the plate 152 effects a movement of the cam face thereof which is so designed as to cause actuation of the vertical plungers and, consequently, operation of the hook-forming mechanism. It is obvious that the cam face may be so proportioned as to actuate the several plungers in the proper order to effect a movement of the several parts constituting the hook-forming device in timed relation to form a hook. The operation and mechanical details of a device of this character are well known and no further description is, therefore, considered necessary.

It will be evident that the inserting and forming mechanism must be operated with each step of the successive movements of the conveyor and that, when the hook-forming operation upon a given work part has been completed, the actuation of this mechanism must be terminated automatically. Any suitable means may be provided for this purpose.

In the present invention, a preferred form of stop is illustrated in Figs. 1, 8 and 9 and comprises mechanism for releasing the supplemental driving shaft 48 from the main driving shaft 47. The shaft 47 is secured to the internal structure of the clutch which was referred to hereinbefore. The internal structure is caused to engage the external member of the clutch through the oscillatory movement of a shaft 197 (see Fig. 9) when the shaft is turned in the direction of the arrow "Y". An engagement is normally maintained between the shaft 47 and the member 49 of the clutch through the action of a pin 198 which is forced against a lever 199 secured to the shaft 197. The pin 198 is thrust against the lever 199 under the action of a spring 201 disposed in a casing 202 and positioned between one end of the pin 198 and a set screw 203. The internal structure of the clutch is thereby normally actuated to maintain the shaft 48 in engagement with the shaft 47, and a continuous drive of the machine is produced.

Means for interrupting the rotary movement of the lever 199 and for causing its actuation to produce a partial rotation of the shaft 197 to disengage the shafts 47 and 48, consists in the provision of a contact arm 205 secured to one end of a horizontal shaft 206 supported in a bearing 207 integral with the base 15 (see Fig. 9). Secured to the opposite end of the shaft 206 is a crank arm 208 (see Fig. 8) having an off-set portion 209 upon which a roller 210 is carried and disposed in contact with the lower face of the cam member 135 which rotates with the large gear 129.

When the contact member 205 is disposed in the position shown in Fig. 9, it is positioned in the path of the lever 199 which moves in the direction indicated by the arrow "Z". A lug 211, integral with the contact member, will then be disposed in a recess 212 provided in a stop member 213 which member is integral with a hub 214 mounted loosely on a shaft 215 secured to and projecting from the base 15. A hand lever 216 is provided for the manipulation of the stop member 213 integral with the hub 214 and so disposed as to be within convenient reach of an operator.

The stop member 213 and the lug 211 are continuously urged into their engaging positions through the action of a spring 217 secured to a pin 218 fastened to the hub of the contact arm 205 and to a pin 219 secured in the hub 214. Since the stop member 213 is loose on the shaft 215, and the contact arm 205 is pinned to the shaft 206, the pins 218 and 219 may serve as lever members upon which a force is continually exerted by the spring 217 to cause an upward movement of the stop member 213 and a partial rotation of the shaft 206, whereby the roller 210 is tensionally maintained in contact with the surface of the cam 135.

When the contact arm 205 is locked in position by engagement with the lug 211, a movement of the supplemental driving shaft 48 will cause a face 221 of the lever 199 to make contact with a face 222 of the contact arm 205 which is so adjusted that, when the lever traverses a given portion of the face 222, the shaft 197 will be moved about its axis a sufficient distance to effect disengagement of the shafts 47 and 48 through the action of the shaft 197 which, as above set forth, causes a disengagement of the internal mechanism of the clutch from the external member 49. Thus, the shaft 48 will be released from the main driving shaft 47. The lever 199 will remain in contact with the arm 205 until the hand lever 216 is pressed downwardly, the lug 211, then being free from the recess 212, will permit a movement of the contact arm 205 under the action of the spring 201 which continually exerts a force upon the lever 199. This spring 201 has sufficient strength to overcome the force exerted by the spring 217. Thus, the shaft 197 is free to act under the force of the spring 201, with the result that engagement is made between the shafts 47 and 48. The shaft 48 is then continuously rotated a given number of turns.

It will be noted that, when the contact arm 205 is in position to oppose the movement of the lever 199 and thereby terminate the rotation of the shaft 48, the roller 210 (see Fig. 8) which is carried on the crank arm 208, is disposed in a recess or depression 223 provided in the surface of the cam 135. The cam 135 is secured to the hollow shaft 131 (see Fig. 2) which rotates about the sleeve 18, the shaft 131 being driven by the relatively large gear wheel 129 which, in turn, is driven by its connection to the shaft 48, as above described.

Assuming that the lug 211 is disposed in the recess 212, it will be evident that the rotating lever 199 will engage the contact arm 205, resulting in a termination of movement of the shaft 48, at which time the roller 210 will be disposed in the recess 223.

The operator may then press the lever 216 downwardly to disengage the lug 211 and the stop member 213. The contact arm 205 thus being released, the pin 198 moves the lever 199, and the internal mechanism of the clutch is actuated, thus producing a connection between the shafts 47 and 48.

The shaft 48 is then driven, with the result that the various movable parts of a machine are set in motion, including the cam 135 which rotates and causes the roller 210 to traverse the face of the cam until it is positioned on the level surface thereof and maintained in a slightly lower plane than when positioned in the depression, and the crank arm 208 is thereby moved, with the result that the movement is translated through the shaft 206 to the contact arm 205, and the lug 211 thereof becomes disposed upon the upper edge of the stop member 213. An operator may release the lever and the lug, and the upper edge of said member will be maintained in contact through the action of the spring 217. When the depression 223 of the cam 135 is again so disposed that the roller 210 enters the depression 223, the contact arm 205 will be moved and the lug will again be disposed in the recess 212. It will, therefore, be understood that the operative parts of the machine may be automatically stopped after any given number of operations have been performed by suitably positioning the depression 223 with respect to the roller 210.

As heretofore explained, it will be seen that the mechanism for driving the various parts of the machine may be independently controlled by separate stop devices. It has been found, however, in practice that considerable time and economy of movement on the part of the operator is attained by having the several stop mechanisms associated and means for controlling the stop devices simultaneously or in sequence by a single manual movement.

In the present invention, the sequential or simultaneous actuation of the stop devices is produced by the provision of a number of connecting elements shown more clearly in Figs. 10 and 11. As illustrated, the bell crank 92, employed for actuating the conveyor stop mechanism shown in Fig. 8, is provided with a supplemental arm 224. The operative connection between the treadle through the rod 89 may be maintained.

A link 225, which may, however, be pivotally connected to the arm 224 by a pin 226, extends substantially transversely of the machine and is pivotally connected by a pin 227 to one arm of a bell crank 228 which is movable about a pin 229 journaled in a suitable bearing (not shown). The other arm of the bell crank may be pivoted by a pin 230 to a vertical member 231. This vertical member is provided with a projection 232 which may be normally disposed above the end of the hand lever 216. This connection between the hand lever 216 and the bell crank 228 is clearly shown in plan view in Fig. 10. By the provision of the connected elements above described, a downward movement of the rod 89 will result in an actuation of the arm 95 of the bell crank 92, causing a release of the conveyor and, at the same time or soon after, depending upon the relative position of the projection 232 and the lever 216, the supplemental arm 224 will be moved in the direction indicated by an arrow in Fig. 11, causing a movement of the link 225 and a consequent movement of the bell crank 228 in the direction indicated by arrows; thereby effecting a downward pull on the vertical member 231, the projection of which engages with the hand lever 216 and unlocks the lug 211 from engagement in the recess 212 of the stop device shown in Fig. 9. The result of this readjustment of the several parts causes an actuation of the machine, as has already been described.

Having now described the various elements which operate to translate motion and actuate the various other elements of the machine, the respective steps in forming the buttons and inserting the wires will now be set forth. A button is formed at the end of an arbor or at any point in the arbor throughout its length (see Figs. 1 and 2) by the downward movement of press or push rods 235 or 236, the former serving to shape the top button and the latter actuating to produce the lower button. The said rods are carried by arms 237 and 238, respectively, secured to a single hub 239 which is pinned or otherwise secured to a plunger or reciprocable member 241 which is disposed in the sleeve 18 with its axis substantially coincident with the vertical axis of the machine. The plunger 241 is maintained in a normal upper position by the expansive action of a spring 242 disposed between the hub 239 and a collar 243 screwed upon the upper end of the sleeve 18. This collar also limits the upward movement of the conveyor hub 22.

Figure 12:
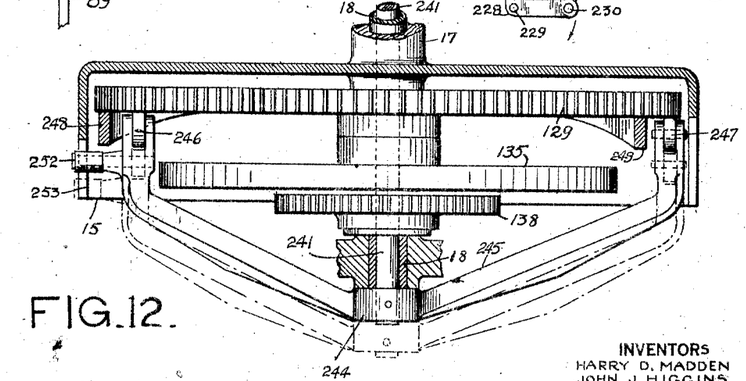
Fig. 12 is a side view, partly in section, of the lower portion of the machine showing the elements for actuating the button-forming mechanism.

The lower end of the plunger 241 is secured to a hub 244 of a bracket or yoke 245 which is more clearly illustrated in Fig. 12. The ends of this bracket project upwardly and are provided with rollers 246 and 247 which are maintained in contact with the lower surface of the gear wheel 129 under the action of the above mentioned spring 242. For the purpose of moving the plunger downwardly, the lower surface of the gear wheel 129 is provided with cams 248 and 249 so disposed that a rotation of the gear wheel 129 will cause the rollers 246 and 247 to traverse the cams and move the plunger 241 downwardly in opposition to the spring 242, the upward movement of the plunger being effected by the recovery of the spring when the rollers leave the cam faces.

It will be noted that the cams 248 and 249 are positioned eccentrically in order that one complete revolution of the gear 129 will cause a single downward movement of the plunger 241 and that the rollers 246 and 247 will engage simultaneously with the cams 248 and 249 and have a uniform downward movement, thereby maintaining a balance of the bracket and avoiding lateral strain on the plunger. A side roller is positioned on a pin 252 and is movable vertically in a slot 253 in the casing for the purpose of preventing rotary movement of the bracket. The cams 248 and 249 are so positioned and proportioned as to effect a movement of the plunger 241 a given distance; and a downward travel of the push rods 235 and 236 with the result that a button is formed at the top of the arbor and at a point throughout the length of the arbor, depending upon where heat is applied. In order to form a button, a suitable portion of the arbor is first rendered plastic by its disposition in a heat zone.

The heat zone created for softening the upper portion of an arbor comprises a plurality of stationary gas burners 254, as shown in Fig. 2. The burners may be of any suitable construction, preferably mounted on a standard and capable of creating a heat zone around the outer portion of the rod.

A burner which cooperates in the formation of the lower button is, in the present invention, adapted to be automatically positioned about the rod or arbor for a given time interval and to be removed from the proximity of the arbor to permit its movement to another station with the conveyor.

Figure 13:
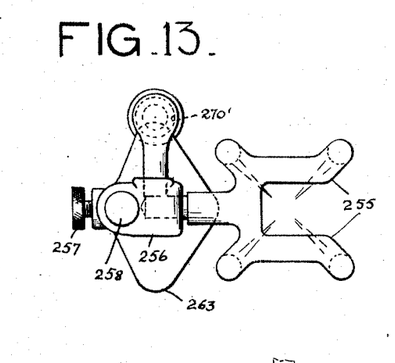
Fig. 13 is a plan view of a movable heating element.
Figure 14:
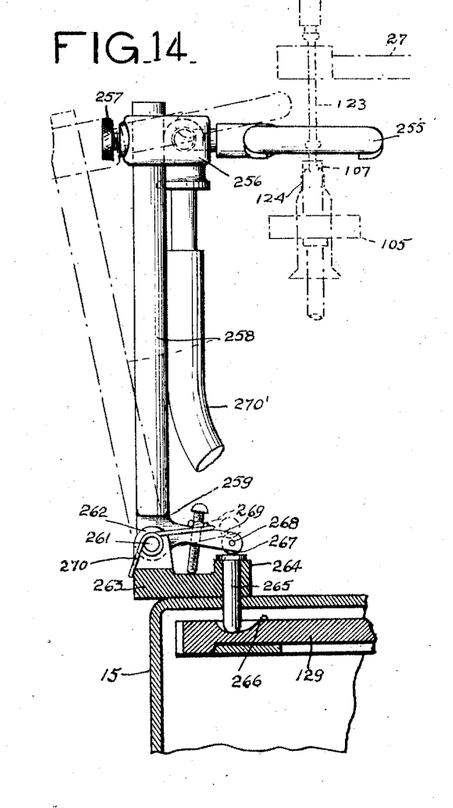
Fig. 14 is an elevation, partly in section, of the heating element shown in Fig. 13 and illustrating its connection to the base of a machine.

Mechanism for operating this movable burner is shown in Figs. 13 and 14 in which a set of burners 255 is connected to a manifold 256 secured by a set screw 257 to an upright arm 258 of bell crank 259. The bell crank is pivoted on a pin 261 journaled in bearings 262 integral with a bearing plate 263 which is secured to the base 15 of the machine. This bearing plate is provided with a vertical bearing 264 in which is movably disposed a pin 265 having its lower end in contact with the upper cam surface 266 of the gear 129 and its upper end in contact with a roller 267 mounted on a pin 268 disposed in a relatively short arm 269 of the bell crank 259.

The upper surface 266 of the gear 129 is provided with a suitable undulated portion so formed that a given movement of the gear wheel causes the undulated portion of its surface to engage the rod 265 and rock the bell crank, as shown in dotted lines in Fig. 14, thus removing the burner from the path of movement of the arbor, and permitting the return of the burner through the action of a spring 270 to position to heat a work part after a suitable movement of the gear wheel 129 and when a work part is registered in proper-relation to the burner. Gas may be led to the burner from a gas main by a flexible tube 270'.

This machine may be attended by a single operator who inserts the work parts and removes them after the various operations have been performed. For the purpose of this description, it is assumed that the main driving pulley 46 is being driven by any suitable source of power (not shown) and that the wire-inserting and hook-forming mechanism are disengaged from the drive. The initial or loading and unloading position of the conveyor, indicated by the letter "E", is clearly shown in Fig. 1, and one of the lugs 74 secured to the spider arms is disposed in the recess 75 of the stop arm 68, thus terminating the movement of the conveyor by virtue of the frictional connection which associates it with the main driving mechanism. While the conveyor is held in the first stage of its movement, a work part is inserted into the head 98 and between the jaws 106 and 107 thereof and between the upper jaws 28 and 29 of the conveyor which latter jaws are automatically moved to an open position for the admittance of the work part when the jaws are at the loading and unloading station, by reason of a suitably positioned raised surface 44 of the cam face 41.

After positioning a work part, the operator actuates the treadle connected to the rod 89 and disengages the lug 74 from the recess 75, thereby permitting the conveyor to rotate by means of its indirect frictional engagement with the shaft 57 which, in turn, is driven by the main driving mechanism, as above explained. The conveyor then moves counter clockwise one stage of its movement whereupon a lug of the succeeding spider arm engages the stop and terminates the movement of the conveyor, bringing the positioned work part to station indicated by the letter "F" and within a heat zone created by the burners 254 shown in Fig. 2. The burners are so constructed as to heat the upper portion of the work part or arbor to render it plastic. When the work part has been sufficiently softened, the lever 216 (see Figs. 8 and 9) is pressed downwardly, thus effecting the engagement of the main drive with other mechanism which operates to rotate the gear wheel 129, with the result that the push rod 235 is moved in contact with the softened portion of the rod, and enlargement or button is thus produced thereon. The operation of the mechanism which actuates the push rod is automatically terminated as the roller 210 enters the depression 223 on the lower side of the cam 135.

During the downward thrust of the push rod 235, it is obvious that the work part must be securely held against vertical movement. Increased pressure, is, therefore, exerted by the jaws 28 and 29 upon the rod by the proper disposition of a depression 43 in the cam face 41 of the annulus 42. This permits the spring 40 which actuates the lever 38 to contract and increase the force or pull upon the arm 38 secured to rod 36 (see Fig. 2) with the result that the jaws 28 and 29 are more firmly pressed against the work part.

After the formation of the upper button, the stop mechanism is actuated and the conveyor is permitted to move another step of its travel or to station "G". When the work part reaches this station, the lever 216 is again actuated, with a consequent actuation of the various machine elements for the insertion of support wires into the button which has been positioned in operative relation to the wire-inserting mechanism.

The button is heated locally, for each wire inserted, by any suitable means which, in the present instance, may comprise a properly disposed flame 272 which is indicated in dotted lines in Fig. 4.

It is, however, necessary, after the insertion of each wire, to rotate the work part. This is accomplished by intermittently rotating the holder or head 98 mounted in the hub 23 of the spider arm. During this intermittent rotation of the button, the jaws 106 and 107 securely grip the arbor but the jaws 28 and 29 are slightly opened by the disposition of the roller 39 on a properly proportioned surface of the annulus 42.

The work holder 98 may be intermittently rotated by any suitable means and, in the present invention, is rotated by a mechanism well known to this class of machines. Such mechanism comprises the ratchet wheel 101 (see Figs. 4 and 7) secured to the shaft 99 of the work holder. The ratchet wheel is so positioned as to engage a pawl 273 pivoted on a pin 274 at one end of an arm 275 when the head is disposed in a given relation to the wire-inserting mechanism. The said arm is hinged on a pin 276 secured to the base of the machine and positioned in operative relation to a cam 277. The cam is secured to the shaft 151 which operates the wire-inserting mechanism, thus, as the conveyor is moved to position with respect to the inserting mechanism, the pawl 273 engages with the ratchet wheel 101.

It will be evident that the conveyor having moved the work part to the station "G", and lever 216 having been depressed, the wire-inserting mechanism will operate to cause a rotation of the shaft 151 and, with each rotation thereof, the ram 136 will insert a wire into the button and form a hook at the end of the wire, after which the cam 277 will cause a movement of the arm 275, with a resultant partial rotation of the work holder, thus rotating the button a given number of degrees, which will depend upon how many wires are to be inserted about the button. A spring 278, secured to one end of the pawl 273, acts to return the arm to its normal position which is contiguous to the cylindrical surface of the cam 277. It will be obvious that, at each stationary period of the conveyor and during the insertion of wires in another arbor, the operator inserts a work part in a holder at the initial position "E".

When the support wires have been inserted in an upper button, the operation of the wire-inserting mechanism is automatically terminated. The stop mechanism is then actuated and the work part is moved to station "H" and the lever 216 is again depressed, permitting the actuation of the various machine elements, including the gear wheel 129, the upper cam surface thereupon, engages pin 265 (see Fig. 14) which enters the depression in the said surface and causes the movable burners 255 to be positioned about a given portion of the work part which is thereby rendered plastic and is subsequently upset or enlarged by a downward force applied by the push rod 236. These burners are indicated in dotted lines in Fig. 1 in their positions about the rod.

During the operation of forming the lower button, the upper jaws 28 and 29 of the conveyor are, by means of one of the depressions in the annulus 42, moved tightly against the work part to secure it from lateral movement but not with a sufficient degree of pressure to prevent the upper portion of the work part from moving downwardly when the push rod 236 makes contact with the upper part thereof. The stop mechanism is then again actuated, and the conveyor moves the work part to station "I," at which the wires are inserted into the last-formed or lower button.

The inserting operation is similar to the insertion of wires in the upper button, with the exception that it is usually the practice to insert a lesser number of wires in the lower than in the upper button, and it will be obvious that the machine may be adjusted to accommodate this variation. After the insertion of wires in the lower button, the conveyor is permitted to move the work part to the station "J," and then to the initial station "E." It will be noted that, at the station "J," no operations are performed, and, the distance between the station "I" and the station "E" being greater than the distance between the other stations, an increased time element is provided in which the work part is permitted to cool previous to its removal by the operator when it reaches the station "E."

The foregoing description of operation sets forth the manner of operating the machine by means of the two independent stop mechanisms. When desirable, however, the two said stop mechanisms may be released for operation by a single manual movement, in which case the link 225 is employed, as well as the other machine elements which associate the two stop mechanisms. Other operations of the machine are, however, the same and, by a single depression of the treadle, the bell crank 92 will be rocked and its upper arm actuated to remove the element 68 of the stop mechanism which interrupts the movement of the conveyor. The lower arm of the bell crank 92 will effect a thrust upon the link 225 which, in turn, will so actuate the bell crank 228 that the vertical member 231 will be moved downwardly until the projection 232 engages and depresses the hand lever 216.

It will be appreciated that, by varying the normal relative position of the projection 232 in respect to the hand lever 216, the wire-inserting and button-forming mechanism may be started either simultaneously with the actuation of the conveyor stop mechanism or directly after the release of the conveyor.

Although the present machine is shown as employing six heads or work carriers, it is obvious that more or less of these carriers may be incorporated in a machine embodying the present invention, in accordance with the desired production of the machine.

Considerable advantage is derived from this invention wherein the button is formed and the support wires are subsequently inserted therein. Inasmuch as an operator needs to merely position the work part or partially finished stem in the machine and, by an operation of a treadle, the various cooperating machine elements handle and operate upon the work part without further manual assistance, the work part is returned to the operator in the form of a finished stem or spider.

Although the invention is shown in its preferred form, it is obvious that many structural changes and modifications may be made therein and it is to be understood that the invention is, therefore, not to be restricted to the exact embodiment shown, but includes all other modifications which come within the spirit and scope of the appended claims.

What is claimed is:

1. A stem-making machine comprising means for engaging and aligning a compound article of glass including a rod, means for heating the rod to render plastic a portion thereof and means for compressing the plastic portion to button form, wire inserting and hook forming mechanism, means for positioning said article with the button thereof in operative relation to said mechanism for the insertion of a wire and means for rotating said article a given number of degrees after said insertion.

2. A stem-making machine comprising a conveyor for moving a plurality of stem parts including arbors in a given path, means for rendering plastic portions of said arbors, a plurality of movable members disposed at intervals adjacent said path, means for positioning said stem parts successively in operative relation to said button forming members and means for actuating said members to compress the plastic portions to button shape, means for inserting a plurality of support wires into said button and means for rotating the button a given number of degrees after each insertion.

3. A stem-making machine comprising a conveyor having a plurality of means for supporting rods, button-forming elements and hook-forming elements disposed at intervals adjacent the path of said conveyor and means for moving said conveyor to position said rods successively in operative relation to the said elements.

4. A stem-making machine comprising a conveyor having a plurality of means for supporting rods in vertical positions, button-forming elements and wire-inserting elements alternately disposed adjacent the path of said conveyor and means for moving said conveyor to position said rods successively in operative relation to said elements.

5. A machine of the class described comprising a rod support, means for heating and rendering plastic a portion of said rod, means for shaping said plastic portion to form a button, a support-wire inserting and hook-forming mechanism, means for effecting a relative movement between said rod support and said mechanism to position a rod in operative relation to the latter and means for automatically effecting an intermittent rotary movement of said rod when disposed in operative relation to said wire-inserting and hook-forming mechanism to receive support wires.

6. A machine of the class described comprising means for supporting a rod, means for rendering plastic a portion of said rod, means for forming said plastic portion into a button, means for permitting said button to become relatively cool, means for locally heating a portion of said button and thrusting a wire into said heated portion.

7. A machine of the class described comprising means for supporting a rod, means for rendering plastic a portion of said rod, a movable member engageable with said plastic portion to form a button on said rod, wire-inserting and hook-forming mechanism, means for moving a rod having a button formed thereon in operative relation to said mechanism, means for automatically actuating said mechanism when a rod is positioned in operative relation thereto and for automatically effecting an intermittent rotation of said rod to receive the insertion of support wires in spaced relation around the rod.

8. A machine of the class described comprising means for supporting a rod, means for rendering plastic a portion of said rod, means for forming said plastic portion into a button, means for permitting said button to become relatively cool, means for rotating said rod intermittently, means for heating a portion of said button and means for thrusting a wire therein during the stationary period between each rotation of said rod.

9. A machine of the class described comprising a movable support for a rod, means for automatically moving said support intermittently, means for rendering plastic a given portion of said rod, means for forming a button thereon, wire-inserting mechanism positioned adjacent said support, means for moving said support to position said button in operative relation to said wire-inserting mechanism intermittently, means for rotating said button, means for locally heating said button and means for actuating said inserting mechanism to thrust the end of a wire into said button with each intermittent movement thereof.

10. A machine of the class described comprising a conveyor having means associated therewith for securing a plurality of rods, means for intermittently rotating said conveyor, means for heating a portion of at least one of said rods during rest periods of said conveyor, means for forming a button on at least one of said rods during said periods, means for inserting wires into at least one of said buttons during one of said periods and means for forming hooks upon the ends of said inserted wires.

11. A machine of the class described comprising a conveyor having means for securing a plurality of rods, means for intermittently moving said conveyor, means for forming a button on at least one of said rods during a rest period of said conveyor, means for inserting support wires in buttons previously formed and means for forming hooks at the exposed ends of said inserted wires.

12. A machine of the class described comprising a conveyor having means for securing a plurality of rods, means for intermittently moving said conveyor, means for forming a button on at least one of said rods during a rest period of said conveyor and means for inserting support wires in buttons previously formed.

13. A machine of the class described comprising a conveyor having means for securing a plurality of rods, means for moving said conveyor intermittently, means for rendering plastic a given portion of at least one of said rods during quiescent periods of said conveyor, means for shaping said plastic portions to button form, means for inserting support wires in said buttons and means for forming loops on the exposed ends of said wires.

14. A machine comprising a conveyor for supporting a plurality of glass work parts, means for locally heating said parts, wire-inserting mechanism disposed in cooperative relation to said conveyor, a common source of power for driving said conveyor and said inserting mechanism and means for automatically terminating the movement of said conveyor independently of the means for actuating said inserting mechanism.

15. A machine comprising a conveyor for supporting a plurality of glass work parts, means for heating said parts, wire-inserting and hook-forming mechanism disposed in cooperative relation to said conveyor, a common source of power for driving said conveyor and said inserting and hook-forming mechanism and means for automatically terminating the movement of said conveyor independently of the operating elements of said inserting and hook-forming mechanism.

16. A machine comprising a conveyor for supporting a plurality of glass work parts, means for locally heating to render plastic portions of said work parts, wire-inserting and hook-forming mechanism disposed in cooperative relation to said conveyor, a common source of power for driving said conveyor and said inserting and hook-forming mechanism and means for releasing said conveyor from said drive without terminating the movement of the elements for operating said wire-inserting and hook-forming mechanism.

17. A machine comprising a conveyor for supporting a plurality of glass work parts, means for rendering plastic portions of said work parts, wire-inserting mechanism disposed in cooperative relation to said conveyor, a common source of power for driving said conveyor and said inserting mechanism, means for automatically terminating the movement of said conveyor and means for permitting the movement of said conveyor independently of the actuation of said inserting mechanism.

18. A machine comprising a conveyor for supporting a plurality of glass work parts, means for heating said parts, means for moving said conveyor in a series of intermittent stages, wire-inserting and hook-forming mechanism disposed in cooperative relation to said conveyor, a common source of power for driving said conveyor and said hook-forming and inserting mechanism, and means for starting and stopping said conveyor independently of the movement of elements for producing an actuation of said inserting and hook-forming mechanism.

19. A machine comprising gripping members, means for supporting a work part by the tensional engagement of said gripping members, means for heating said work part to render plastic a portion thereof, means for automatically varying the tension exerted by said jaws upon the work part and means for shaping said plastic portion to button form.

20. A machine comprising gripping members, means for supporting a work part by the tensional engagement of said gripping members, means for heating said work part to render plastic a portion thereof, means for shaping said plastic portion to form a button and means for automatically varying the degree of pressure exerted upon said work part by said gripping members.

21. A machine comprising jaws for tensionally securing a work part, means for rendering plastic a portion of said work part, means for shaping said plastic portion to button form, means for automatically increasing the pressure of said jaws upon said work part during the formation of said button and means for inserting a plurality of support wires in said button.

22. A machine comprising a movable support for a work part, said support including movable jaws for securing said work part, means for rendering plastic a given portion of a positioned work part, means for moving said support to position a portion of said work part adjacent said first means, means for forming a button from said softened portion and means for inserting wires into said button.

23. A machine comprising a conveyor having movable jaws associated therewith for securing a plurality of rods, means for intermittently rotating said conveyor, means for locally heating at least one of said rods during quiescent periods of the conveyor, means for forming a button on at least one of said rods during said periods and means for securing the rod operated upon with increased pressure during the formation of said button.

24. A machine comprising a conveyor having movable jaws associated therewith for securing a plurality of rods, means for intermittently moving said conveyor, means for forming a button on at least one of said rods during a quiescent period of said conveyor, means for increasing the degree of tensional contact between said jaws and said rod during the formation of said button and means for inserting support wires into said button.

25. A machine comprising a conveyor having a plurality of pairs of movable jaws mounted thereon, means for moving said conveyor intermittently, means for rendering plastic a given portion of a work part secured by said jaws, means for shaping said plastic portion into button form, means for automatically increasing the pressure of said jaws on said work part during the formation of said button.

26. A machine of the class described comprising a conveyor, gripping jaws associated with said conveyor to support a rod, means for opening said jaws for the insertion of a rod and means for varying the degree of pressure exerted on said rod by said jaws during a movement of said conveyor.

27. A machine of the class described comprising a conveyor, a plurality of pairs of jaws associated with said conveyor, means for tensionally closing said jaws and means for varying the degree of pressure upon an object inserted therebetween during a rotation of said conveyor.

28. A machine of the class described comprising a conveyor having a plurality of pairs of jaws, means for manually opening and automatically closing one of said pairs of jaws and means for automatically opening and closing the remaining pairs of jaws.

29. A machine of the class described comprising a conveyor having an upper and lower pair of jaws, means for manually opening and automatically closing the lower pair of said jaws and means for automatically varying the degree of opening of the upper pair of jaws.

30. A machine of the class described comprising a conveyor having upper and lower pairs of jaws, means for opening said jaws for the insertion of a work part, means for automatically closing said jaws to grip said part, means for rendering plastic a portion of said work part, means for upsetting said plastic portion and means for increasing the degree of pressure of one pair of jaws upon said work part to prevent vertical movement thereof during the upsetting operation.

31. A machine of the class described comprising a conveyor having upper and lower pairs of jaws, means for opening said jaws for the insertion of a work part, means for automatically closing said upper jaws to grip said part, means for rendering plastic a portion of said work part, means for upsetting said plastic portion to form a button, means for increasing the degree of pressure of one pair of jaws upon said work part to prevent vertical movement thereof during the upsetting operation and means for actuating said last mentioned jaws to permit a subsequent rotation of said work part and means for inserting support wires into said button.

32. In a machine of the class described comprising a conveyor having work holders consisting of two pairs of jaws one of said pairs being rotatable with respect to said conveyor, means for manually operating said rotatable jaws, means for automatically operating the remaining pair of jaws, means for creating a heat zone adjacent said conveyor, means for operating said conveyor to position a work part carried by said jaws in said heat zone, means for forming a button on said work part, means for slightly releasing the gripping action of said first mentioned pair of jaws, support wire-inserting mechanism positioned adjacent the path of said work holders, means for positioning said work part adjacent said support wire-inserting mechanism and means for rotating said rotatable pair of jaws intermittently during the insertion of support wires in said button.

33. Means for supporting a lamp stem comprising a plurality of pairs of jaws for gripping a stem at different points in its length and means for independently operating one of said pairs of jaws to grip and release said stem, one pair of jaws being automatically operable to vary the degree of pressure exerted upon said jaws.

34. Means for supporting a lamp stem comprising a pair of oscillatory jaws and a pair of slidable jaws, said oscillatory jaws being adapted for manual operation to grip the stem and said slidable jaws being movable automatically to grip and release a stem independent of the action of the manually operable jaws.

35. Means for supporting a lamp stem comprising a pair of oscillatory jaws, means for opening and closing said jaws upon a work part, a pair of slidable jaws, means for closing said slidable jaws to apply a predetermined pressure upon a work part and means for increasing the degree of pressure upon said work part.

36. Means for supporting a lamp stem comprising a pair of oscillatory jaws movable about independent axes and a pair of slidable jaws having racks integral therewith, a pinion in mesh with said racks to effect an opposite movement of said jaws upon a rotation of said pinion and means for rotating the pinion to a greater or lesser degree to vary the degree of force applied by said slidable jaws to a work part.

In testimony whereof, we have hereunto subscribed our names this 26th day of April, 1922.

HARRY DE FOREST MADDEN.
JOHN JOSEPH HIGGINS.